United States Patent Office 3,393,059
Patented July 16, 1968

3,393,059
DECONTAMINATION OF PETROLEUM PRODUCTS
James E. Webb, Administrator of the National Aeronautics and Space Administration, with respect to an invention of James R. Mosier, Altadena, Calif.
No Drawing. Filed May 18, 1965, Ser. No. 456,874
4 Claims. (Cl. 44—77)

ABSTRACT OF THE DISCLOSURE

The patent describes a means and method of effectively controlling bacteria growth in petroleum products, as well as trapping other impurities such as water and solid particles which normally settle to the bottom of stored petroleum products by the use of a small effective amount of honey.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

With the increased refinement in jet engines, the fuel specifications for jet fuels have become increasingly restrictive. The elimination of contaminating materials such as water, particulate matter, and microbes is particularly important. The reasons become apparent upon consideration of the volume of fuel handled in a modern jet engine. For example, a large modern jet engine can burn in excess of 1,000 gallons of jet fuel per hour. Because of the need to handle increased volumes of fuel and operate fueling systems at much higher throughput rates, the presence of even very small amounts of contaminants can cause serious problems. Further, conventional jet fuels have both a higher viscosity and a greater specific gravity than simple aviation gasoline. Both of these factors make removal of contaminants through settling and other known means more difficult.

Water, particulate matter, and microbes can act signly or in combination to cause a variety of fuel troubles. Aircraft fuel filters may be fouled by the formation of ice or by the accumulation of solids. Precision fitted moving parts found in fuel controls can be easily jammed and damaged by particulate matter. Fuel gages and flow dividers malfunction when contaminated by foreign material. In addition, it has been found that the contaminants are responsible for the wing tank corrosion which has been observed in aircraft, wherein the wing itself is used as the fuel tank. Analyses of corroded areas have revealed, besides aluminum products, the presence of iron oxides, alkali metal salts, and silica. Water removed from the aircraft has frequently shown high concentrations of salt and other minerals to be present. Studies of the slime materials in water have also revealed the presence of microorganisms.

Of the particulate matter found in jet fuels, iron oxides comprise the bulk. This follows from the fact that iron is the most common material used in the construction of fuel-handling and transportation systems. Iron rust is believed to play an important part in the corrosion phenomenon. It has the ability to hold free water on its surface and is known to accelerate the development of certain bacteria in fuel systems. Its tendency to become firmly attached to coating materials is believed to be instrumental in causing perforation of coatings.

It has been found that many of the microorganisms which exist in kerosene fuels, can actually utilize hydrocarbons as an energy source in their metabolisms. Many forms of microorganisms have been identified, including bacteria, fungi and yeasts. The microbes are believed to be introduced into the fuel tank of the aircraft during fueling due to contamination of the fuel with water and/or particulate matter. It has been found that maximum growth of the microbes appears to be concentrated at the fuel-water interface, and that an aqueous phase must be present for active growth to occur. It is certain that organic acids and other metabolic products produced by the microbes are capable of corroding metals. Laboratory studies have demonstrated that topcoatings can be degraded by attached microbes and that the underlying metal can become corroded. In addition to acid-producing abilities, the moisture-holding properties of microbes may also induce corrosion.

As has already been indicated, the effective control of microbes, water and particulate matter in the fuel is necessary for many reasons.

Accordingly, it is an object of this invention to provide a novel means whereby bacterial growth in hydrocarbon petroleum products is effectively controlled.

Another object of this invention is to provide a means for trapping other impurities such as water and particulate matter normally present in petroleum fuels.

More particularly, it is an object of this invention to provide a means for maintaining jet fuel in a state which is substantially free of contaminants.

These, and other objects of the invention will become apparent from the detailed description which follows.

Briefly, the present invention relates to the discovery that bacterial growth in normally liquid hydrocarbon-type petroleum products, such as kerosene, is effectively controlled by the addition of ordinary honey to the bottom of the fuel storage tank. Secondary effects accomplished by the use of honey are that it traps dirt, water and other particulate material entrained in the jet fuel.

It has been found that absolutely no mixing or combining takes place between ordinary honey and jet fuel such as JP–4, or other essentially hydrocarbon fuels which are liquids at ambient storage temperature. Therefore, a fuel tank where fuel will be stored for a substantial period of time can be partially filled with honey and completely filled with kerosene. In general, the honey is simply placed in the bottom of the fuel storage tank or other container and the kerosene is added. The amount of honey used is not critical since even small amounts reduce the amount of contamination in the fuel. The honey is usually present in an effective decontaminating amount sufficient to cover the bottom of the storage tank up to 5 or 10% by volume of fuel.

The following example illustrates the invention.

Example

Into a 100 gallon storage tank is placed 1 gallon of honey and about 80 gallons of commercial JP–4. After storage for several weeks, the following effects were observed:

(1) The honey attracts and holds water at the petroleum-honey interface. This hygroscopic action prevents the re-entry of this water into the petroleum product.

(2) Honey is a bacteriocide and prevents the growth of rust and slime-causing bacteria and all other bacteria normally found in petroleum product tank-bottom waters.

(3) Honey lowers the freezing point of entrained water.

(4) Honey effectively serves as a petroleum product filter by trapping and permanently holding all particulate matter such as dust, grit, metal particles and the like.

(5) The honey will not deteriorate if 22% minimum water balance is maintained. Also, the compound can be filtered at intervals to remove trapped impurities and is 100% reusable.

(6) The honey is nonexplosive and nonflammable.

The kerosene which can be beneficially stored in the presence of honey according to my invention is of the ordinary commercial type having a distillation end point of 625° F. maximum, and a flash point of 115° F. minimum. However, the invention is also applicable to the wide variety of hydrocarbon-type petroleum products subject to contamination problems, as will be apparent to those skilled in the art.

Having fully described the invention, it is intended that it be limited only by the lawful scope of the appended claims.

What is claimed is:

1. A novel composition of matter comprising a normally liquid hydrocarbon petroleum product containing a small effective decontaminating amount of honey.

2. A novel composition of matter comprising kerosene jet fuel containing therein a small effective decontaminating amount of honey.

3. The composition of claim 1 wherein the honey is present in an amount up to about 6% by volume of said hydrocarbon petroleum product.

4. The novel method for the storage of a normally liquid hydrocarbon petroleum product to prevent the accumulation of contamination which comprises covering the bottom of a storage tank with honey, and then adding the fuel thereto for storage.

References Cited

UNITED STATES PATENTS 2,975,042  3/1961  Summers _____ 44—78

OTHER REFERENCES

McCulloch: "Disinfection and Sterilization," 2nd edition, 1945, p. 174.

Gregory: "Uses and Applications of Chemicals and Related Materials," vol. II, 1944, p. 319.

"Chem. Absts."—49: 13356a K. Ehergard Meier and Gerhart Freitag, "Z. Hyg. Infektions" Krankh, 141, 1955, pp. 326–32.

DANIEL E. WYMAN, *Primary Examiner.*

Y. H. SMITH, *Assistant Examiner.*